D. Manuel.
Bedstead.
No. 3,655. Reissued Sept. 28, 1869.
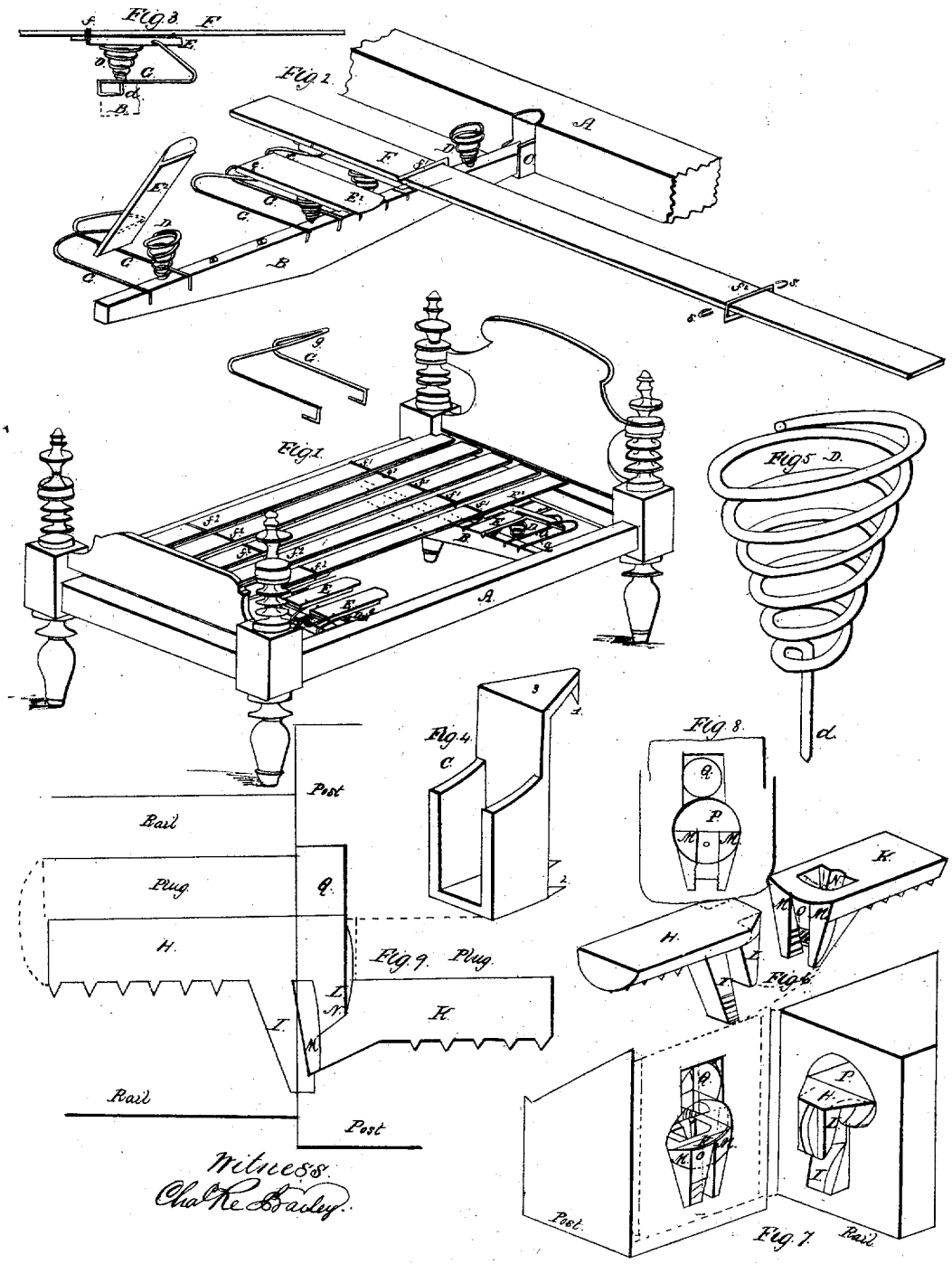
Witness.
Chas. R. Bailey.
Inventor.
David Manuel
N. PETERS, PHOTO-LITHOGRAPHER, WASHINGTON, D. C.

United States Patent Office.

DAVID MANUEL, (FOR HIMSELF,) OF DEDHAM, AND FREDERICK K. BALLOU, (ASSIGNEE, BY MESNE ASSIGNMENTS, OF DAVID MANUEL,) OF FOXBOROUGH, MASSACHUSETTS,

*Letters Patent No.* 38,202, *dated April* 14, 1863; *antedated October* 14, 1862; *reissue No.* 3,655, *dated September* 28, 1869.

IMPROVED BEDSTEAD.

The Schedule referred to in these Letters Patent and making part of the same.

*To all whom it may concern:*

Be it known that DAVID MANUEL, of Dedham, in the county of Norfolk, and State of Massachusetts, has invented new and useful Improvements on Spring-Bottom Bedsteads; and we do hereby declare that the following is a full, clear, and exact description of the construction and operation of the same, reference being had to the accompanying drawings, making a part of this specification, in which—

Figure 1 is a perspective view of the bedstead when together, two of the slats being removed to show the head and foot cross-bars B, which bars support the springs and bearings on which the slats rest, and also their connection with the rails of the bedstead, on which they also exert an influence transmitted to the fasteners, as will be shown.

Figure 2 is an enlarged view, in part, of the same.

B, a cross-bar.

C, the box affixed to the rail A.

D, the inverted conic springs.

E, the bearings.

F, a slat, attached at one end to the bearings by its embracing bracelet *f*.

$E^1$ shows a bearing in position.

$E^2$, the same, turned up on its hinged spring-support G, showing the shoulder on the under side, against which the bracelets *f* set, and the edged terminus with its corners rounded, so as to be readily slipped under the loop of the bracelets, which latter are held by staples *s*, driven over them on the edge of the slats F. Figure G shows the metallic rod when bent. A hole is bored horizontally across the centre of the bearings through which the rod is inserted to *g*. The projecting ends are then bent, as shown, and applied by driving the lower points into the inner side of the cross-bars, as shown, resting on and partly embracing them.

Figure 3 is a profile view of the combination and arrangement of the same.

Figure 4 is an enlarged view of the open box *c*, for the support of the ends of the cross-bars B. The top 3 is at right angles to the back of the box, and rests on the upper surface of the rails, having a sharp point, 1, which, with a stroke of the hammer, is driven into the rail on its top. The back of the box is also provided with two or more of such points 2, made in the casting, which, by another stroke of a hammer, are driven into the inner side of the rails, and thereby affixed as firmly as if secured by screws, at a great saving of time, labor, and expense.

Figure 5 is a view of the single conic coiled spring D, having its apex *d* centrally prolonged, by which it is inserted into a hole, a series of which is made, centrally, at regular intervals, along the upper side of the cross-bars B. In this inverted position, with the broad base coiled so as to be horizontal, on which base rests the bearing, steadied by its side supports G, being both a hinge and additional spring, as well as a support, requires no webbing or binding to support the springs, they being found admirably adapted for this and similar purposes, and easily made and applied.

Figure 6 shows the piece or casting H, inserted into the ends of the rails, and its counterpart K inserted into the post, detached.

Figure 7 shows them when inserted into their respective places.

Figure 8 shows a front view of the post and piece K inserted, its outer face M M flush with the wood.

Figure 9 is a vertical section, full size, of the two pieces, locked.

The projecting point of H being provided with a tongue, L, to fit into the slot N on K, partly overlapping it, requires a portion of the post, centrally above, to be taken out for raising and introducing the same. The rail, however, closes or hides all from view, being brought up closely against the post above, beneath, and on the sides of the arrangement.

The object in view is to make a combination for a complete spring-bottom bedstead with all its parts simple, durable, and readily put up and taken apart without a screw-driver, in the briefest period of time possible, in cases of emergency caused by fire or otherwise. This object, it is confidently believed, is attained by the several devices employed. The slats are very light, only three-eighths of an inch thick, and by their simple connection with the hinged bearings, become disengaged by simply raising them at the centre, when the bearings give so as to withdraw themselves. They are replaced with equal ease through the medium of the hinged bearings, being peculiarly adapted for the purpose by this arrangement, In order to understand the application of the fasteners, we will observe that as the tongues and slats are attached in front, cast in each piece, requiring no subsequent fitting up, to a semicircular body or shank, with a series of teeth on their lower half-round portion, while they are flat on their upper surface, as shown, say one and one half inch wide, a hole of that diameter is bored a proper depth into the ends of each rail, and on the proper sides of the posts. These holes are bedded beneath with a composition of glue and sawdust, and the shanks inserted into their respective places. A half-round wooden plug, saturated with glue or not, is driven over each so as to cause their teeth to penetrate the wood with which, and the glue and sawdust-bedding, they will become firmly lodged and permanently affixed. A three-quarter inch hole is also made, of the proper depth, in the post, above the plate K, and squared out by a few strokes of a chisel, for the admission of the projecting portion of the piece or plate H, in order that the slot N in K may be reached by L on H, the tongue I bracing and fitting into the opened bevelled slots *o* in K, making a firm lock, yet easily disengaged by simply lifting the rail. To guard against being displaced when merely desiring to lift the bedstead by the rail, to move it, the lower outer portion of the tongue L, and lower inner sides of the bevelled open slots *o*, of the several plates, H K, are corrugated. These corrugations are, however, made operative by means of the cross-bars B, made so as to slightly wedge the rails, as before intimated to be explained, thereby forcing the corrugations to interlace and thereby preventing their disengagement, without first withdrawing the cross-bars, thus constituting an intimate relation between the spring-bottom arrangement and bedstead fasteners.

We are aware that numerous devices are employed for fastening bedsteads with hooks, slots, tongues, &c., but we are not aware of any being constructed substantially as and applied in the manner herein specified. We are also aware that hooks and boxes are employed for the cross-bars, screwed against the inside of the rails; such is not claimed. We are also aware that coiled springs, slats, loops, and bearings are not new, but we are not aware that any or either of those are arranged and applied in the manner as herein described.

What is claimed, and desired to be secured by Letters Patent, is—

1. The combination of conically-coiled spring D, having its apex *d* inserted in the bar B, with bar B, box C, and slat F, arranged substantially as herein described.

2. The combination of conically-coiled spring D, for the support of the bearing E, having additional spring rod and hinge G, shouldered for the loops or bracelets *f*, on slats F, and supporting and wedging cross-bars B and boxes C, all arranged and applied in the manner specified.

3. The slotted and tongued bed-rail fasteners H K, constructed and applied substantially as specified.

In testimony whereof, we have hereunto signed our names, in the presence of two subscribing witnesses.

DAVID MANUEL.
FREDERICK K. BALLOU.

Witnesses:
EDWD. D. WRIGHT,
M. S. G. WILDE.